(12) United States Patent
Sasao et al.

(10) Patent No.: US 11,994,229 B2
(45) Date of Patent: May 28, 2024

(54) SOLENOID VALVE

(71) Applicant: DENSO CORPORATION, Kariya (JP)

(72) Inventors: Kazuhiro Sasao, Kariya (JP); Shinichi Kondou, Kariya (JP)

(73) Assignee: DENSO CORPORATION, Kariya (JP)

( * ) Notice: Subject to any disclaimer, the term of this patent is extended or adjusted under 35 U.S.C. 154(b) by 92 days.

(21) Appl. No.: 17/949,086

(22) Filed: Sep. 20, 2022

(65) Prior Publication Data

US 2023/0011647 A1   Jan. 12, 2023

Related U.S. Application Data

(63) Continuation of application No. PCT/JP2021/011107, filed on Mar. 18, 2021.

(51) Int. Cl.
| | | |
|---|---|---|
| *F16K 11/07* | (2006.01) | |
| *F16K 27/04* | (2006.01) | |
| *F16K 31/06* | (2006.01) | |

(52) U.S. Cl.
CPC .......... *F16K 31/0613* (2013.01); *F16K 11/07* (2013.01); *F16K 27/041* (2013.01)

(58) Field of Classification Search
CPC .... F16K 31/0613; F16K 27/041; F16K 11/07; H01F 2007/083; H01F 1/127
See application file for complete search history.

(56) References Cited

U.S. PATENT DOCUMENTS

| | | | | |
|---|---|---|---|---|
| 2004/0208391 | A1* | 10/2004 | Kaneda | F16K 39/04 |
| | | | | 382/275 |
| 2005/0178451 | A1* | 8/2005 | Inami | F16K 31/0613 |
| | | | | 137/625.65 |
| 2006/0243938 | A1 | 11/2006 | Ishibashi et al. | |
| 2022/0084730 | A1* | 3/2022 | Kondou | H01F 7/1607 |
| 2022/0128167 | A1* | 4/2022 | Sakai | H01F 7/081 |
| 2022/0154837 | A1* | 5/2022 | Ejima | F16K 47/06 |
| 2022/0285065 | A1* | 9/2022 | Sakai | F16K 31/0675 |
| 2022/0285066 | A1* | 9/2022 | Hirano | F16K 27/048 |

OTHER PUBLICATIONS

U.S. Appl. No. 17/948,962, filed Sep. 20, 2022 to Kazuhiro Sasao (23 pages).

\* cited by examiner

*Primary Examiner* — Kelsey E Cary
(74) *Attorney, Agent, or Firm* — Nixon & Vanderhye P.C.

(57) ABSTRACT

A solenoid valve has a valve portion and a solenoid portion. The valve portion includes a sleeve and a spool. The solenoid portion includes a yoke, a plunger, a stator core, and a base portion. The base portion includes a first inner diameter portion, a second inner diameter portion, and a connection surface that connects the first inner diameter portion and the second inner diameter portion to each other in a radial direction. The first inner diameter portion is fastened to a first outer peripheral surface of the sleeve. The second inner diameter portion is arranged radially outside a second outer peripheral surface of a magnetic attraction core. The base portion is in contact with the yoke. The connection surface and a sleeve end surface of the sleeve adjacent to the solenoid portion in the axial direction are spaced from each other in the axial direction.

9 Claims, 13 Drawing Sheets

SOLENOID VALVE

CROSS REFERENCE TO RELATED APPLICATIONS

The present application is a continuation application of International Patent Application No. PCT/JP2021/011107 filed on Mar. 18, 2021, which designated the U.S. and claims the benefit of priority from Japanese Patent Application No. 2020-050426 filed on Mar. 23, 2020. The entire disclosures of all of the above applications are incorporated herein by reference.

TECHNICAL FIELD

The present disclosure relates to a solenoid valve.

BACKGROUND

A solenoid valve has a solenoid portion and a valve portion. The solenoid portion has a plunger configured to slide in a stator core, inside a coil that generates a magnetic force. The valve portion has a sleeve in which a spool is arranged.

SUMMARY

According to an aspect of the present disclosure, a solenoid valve has a valve portion and a solenoid portion. The valve portion includes a sleeve and a spool. The solenoid portion includes a coil, a yoke, a plunger, a stator core, and a base portion. The base portion includes a first inner diameter portion, a second inner diameter portion, and a connection surface that extends in a radial direction to connect the first inner diameter portion and the second inner diameter portion. The first inner diameter portion is fastened to a first outer peripheral surface of the sleeve. The second inner diameter portion is arranged on a second outer peripheral surface of a magnetic attraction core, on an outer side in the radial direction. The base portion is located inside the yoke and is in contact with the yoke. The connection surface and a sleeve end surface of the sleeve adjacent to the solenoid portion in the axial direction are spaced from each other in the axial direction.

DESCRIPTION OF EMBODIMENTS

Figure 1:
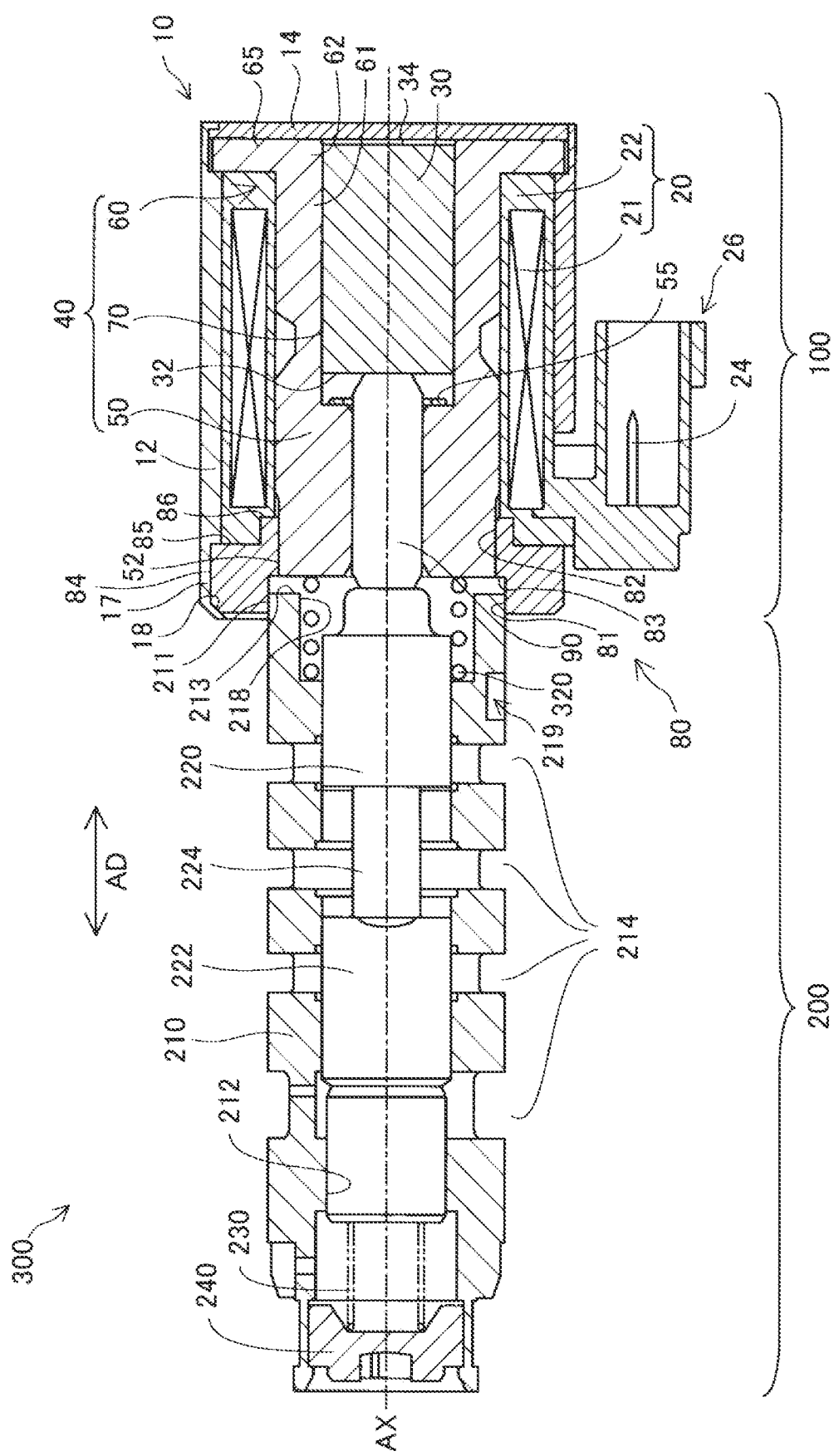
FIG. 1 is a cross-sectional view schematically showing a solenoid valve according to a first embodiment.

To begin with, examples of relevant techniques will be described.

A solenoid valve has a solenoid portion and a valve portion. In the solenoid portion, a plunger slides along a stator core in a coil that generates a magnetic force by energization. The valve portion has a sleeve into which a spool is inserted. In the solenoid valve, a flange formed on the sleeve and a yoke of the solenoid portion are fastened to each other so that the solenoid portion and the valve portion are fixed.

The manufacturing cost of the solenoid valve is increased by forming the flange on the sleeve. Therefore, a new technique is desired for fastening the solenoid portion and the valve portion, which can suppress the manufacturing cost of the solenoid valve.

The present disclosure can be realized as the following aspects.

According to a first aspect of the present disclosure, a solenoid valve includes a valve portion and a solenoid portion. The valve portion has a tubular sleeve extending in the axial direction and a spool arranged in the sleeve to slide in the axial direction. The solenoid portion includes a tubular coil that generates magnetic force by energization and a magnetic yoke housing the coil. The magnetic yoke has a side wall along the axial direction, and a bottom formed along a direction intersecting the axial direction. The solenoid portion has a columnar plunger sliding in the axial direction, and a stator core. A shaft is disposed at an end of the spool adjacent to the solenoid portion in the axial direction so as to transmit a thrust of the solenoid portion to the valve portion. The stator core has a magnetic attraction core arranged to face the tip end surface of the plunger in the axial direction and magnetically attracts the plunger by the magnetic force generated by the coil. The stator core has a sliding core. The sliding core has a tubular core portion arranged inside the coil in a radial direction orthogonal to the axial direction to house the plunger. The sliding core has a magnetic flux transfer portion formed radially outward from a core end which is an end portion of the core portion in the axial direction and faces the bottom so as to transfer magnetic flux between the yoke and the core portion. The stator core includes a magnetic flux passage suppresser configured to suppress passage of magnetic flux between the sliding core and the magnetic attraction core. The solenoid portion has a base portion made of a magnetic pipe arranged inside the yoke to be in contact with the yoke. The base portion has: a first inner diameter portion having a first inner diameter in the radial direction; a second inner diameter portion located between the first inner diameter portion and the bottom in the axial direction and having a second inner diameter smaller than the first inner diameter; and a connection surface connecting the first inner diameter portion and the second inner diameter portion in the radial direction. The first inner diameter portion is fastened to a first outer peripheral surface of an end portion of the sleeve adjacent to the solenoid portion in the axial direction. The second inner diameter portion is located radially outside a second outer peripheral surface of an end portion of the magnetic attraction core adjacent to the valve portion in the axial direction. The connection surface and a sleeve end surface of the sleeve adjacent to the solenoid portion in the axial direction are spaced from each other in the axial direction.

According to the second aspect of the present disclosure, a method for manufacturing the solenoid valve including the valve portion and the solenoid portion is provided. The manufacturing method includes a first step, a second step and a third step. In the first step, the sleeve is inserted into the base portion so that the connection surface and the sleeve end surface are spaced from each other in the axial direction so as to determine the position of the sleeve with respect to the base portion. In the second step, fastening the sleeve and the base portion. In the third step, fixing the base portion and the yoke in the contact state.

Accordingly, the solenoid valve has the base portion. One end of the base portion adjacent to the solenoid portion in the axial direction is fastened to the first outer peripheral surface of the sleeve. The other end of the base portion adjacent to the valve portion in the axial direction is arranged radially outside the second outer peripheral surface of the magnetic attraction core. Therefore, the solenoid portion and the valve portion can be fastened with each other by the base portion. Thus, the structure of the sleeve can be simplified and the manufacturing cost of the solenoid valve can be suppressed, compared with a configuration in which a flange is formed on the sleeve of the valve portion such that the solenoid portion and the valve portion are fastened by fixing the flange to the yoke.

The present disclosure can be realized as the following embodiments. For example, the present disclosure can be realized in an automatic transmission, for a vehicle, using a solenoid valve.

First Embodiment

Figure 2:
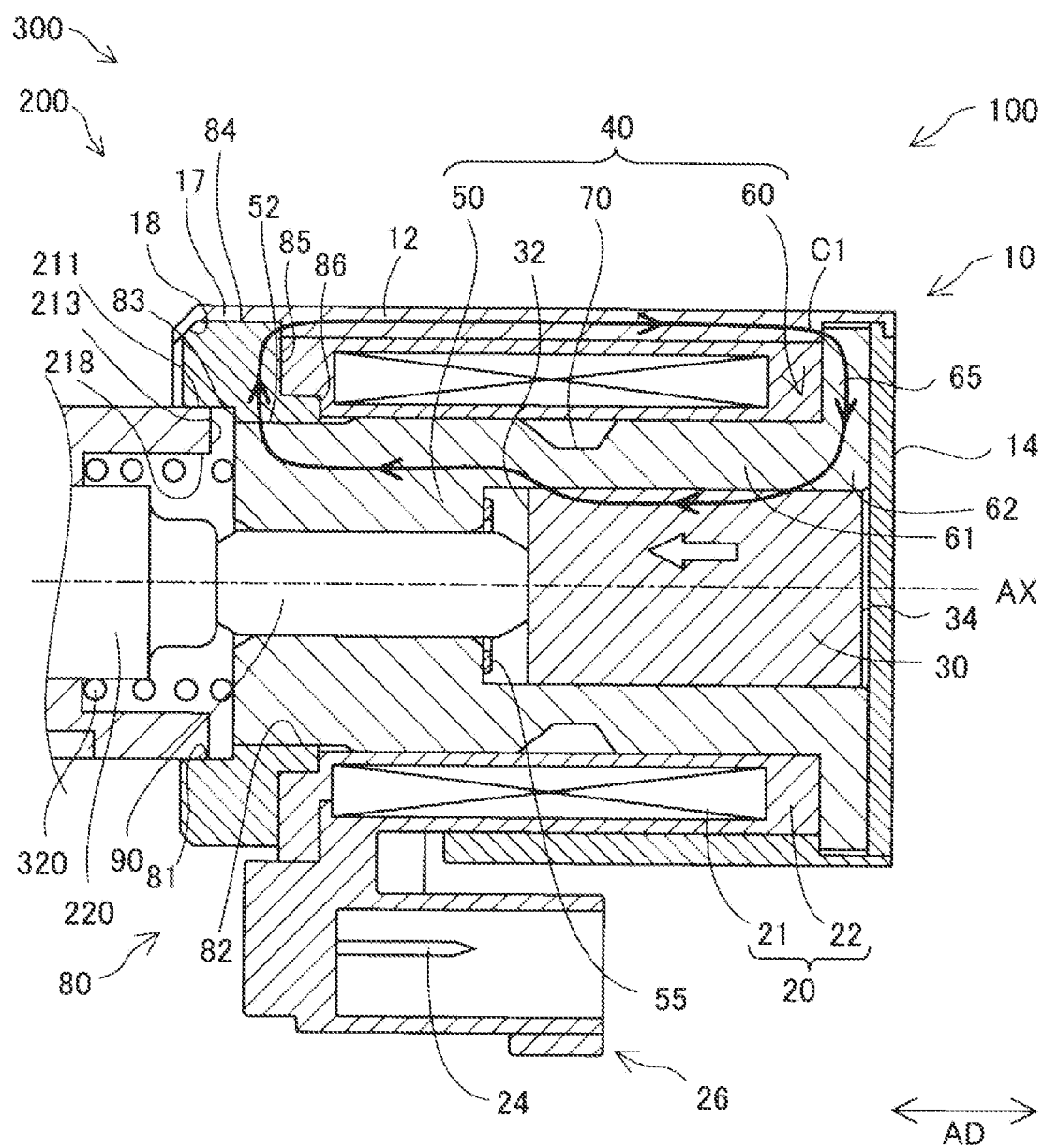
FIG. 2 is a diagram for explaining a magnetic flow in the solenoid valve.

A solenoid valve 300 of a first embodiment shown in FIG. 1 is a linear solenoid valve to control the hydraulic pressure of hydraulic oil supplied to an automatic transmission for a vehicle (not shown). The solenoid valve 300 is mounted on a valve body provided on an outer surface of a transmission case (not shown). FIG. 1 schematically shows a cross section of the solenoid valve 300 taken along a central axis AX. The solenoid valve 300 includes a solenoid portion 100 and a valve portion 200 coaxially arranged along the central axis AX. An axial direction AD shown in FIG. 1 and the following figures is a direction parallel to the central axis AX. FIGS. 1 and 2 show the solenoid valve 300 in a non-energized state. FIG. 2 shows a detailed configuration of the solenoid valve 300 in a vicinity of a base portion 80, which will be described later. The solenoid valve 300 of the present embodiment is a normally closed type, but may be a normally open type.

The valve portion 200 shown in FIG. 1 adjusts opening areas of oil ports 214. The valve portion 200 includes a cylindrical sleeve 210, a spool 220, a spring 230, and a spring load adjuster 240. The valve portion 200 is also referred to as a spool valve.

The sleeve 210 has a substantially cylindrical external shape. The sleeve 210 has an insertion hole 212 penetrating along the central axis AX and the oil ports 214 communicating with the insertion hole 212 and open in a radial direction orthogonal to the axial direction AD. The sleeve 210 has a recessed portion 219 on the outer peripheral surface so as to be recessed inward in the radial direction. The recessed portion 219 is used as a positioning hole when the solenoid valve 300 is mounted on the valve body. The spool 220 is inserted into the insertion hole 212. An end of the insertion hole 212 adjacent to the solenoid portion 100 is formed to have an enlarged diameter and functions as an elastic member housing 218. An elastic member 320 described later is arranged in the elastic member housing 218. The oil ports 214 are formed side by side in the axial direction AD. The oil ports 214 function as, for example, an input port, an output port, a feedback port, a drain port, and the like. The input port communicates with an oil pump (not shown) to receive a hydraulic pressure. The output port communicates with a clutch piston (not shown) to supply a hydraulic pressure. The feedback port applies a load to the spool 220 based on the output hydraulic pressure. The drain port discharges the hydraulic oil. The outer peripheral surface 211 of the end portion of the sleeve 210 adjacent to the solenoid portion 100 in the axial direction AD (hereinafter, also referred to as "first outer peripheral surface 211") is fastened into the base portion 80. Further, as will be described in detail later, the sleeve end surface 213, which is an end surface of the sleeve 210 adjacent to the solenoid portion 100 in the axial direction AD, is separated from the base portion 80 in the axial direction AD.

The spool 220 has a substantially rod-like external shape. The spool 220 has large-diameter portions 222 and small-diameter portion 224 arranged side by side in the axial direction AD. The spool 220 slides along the axial direction AD inside the insertion hole 212, and adjusts the opening areas of the oil ports 214 according to a position between the large-diameter portion 222 and the small-diameter portion 224 in the axial direction AD. A shaft 90 is arranged at the end of the spool 220 adjacent to the solenoid portion 100 so as to transmit a thrust of the solenoid portion 100 to the spool 220. A spring 230 is arranged at the other end of the spool 220. The spring 230 is configured by a compression coil spring, and presses the spool 220 in the axial direction AD to urge the spool 220 toward the solenoid portion 100. The spring load adjuster 240 is arranged to be in contact with the spring 230, and adjusts the spring load of the spring 230 by adjusting an amount of screwing into the sleeve 210.

The solenoid portion 100 shown in FIGS. 1 and 2 is energized and controlled by an electronic control device (not shown) to drive the valve portion 200. The solenoid portion 100 includes a yoke 10, a coil portion 20, a plunger 30, a stator core 40, a base portion 80, and the elastic member 320.

The yoke 10 is made of a magnetic metal, and forms an outer shell of the solenoid portion 100. The yoke 10 has a bottomed cylindrical external shape, and houses the coil portion 20, the plunger 30, and the stator core 40. The yoke 10 has a side wall 12, a bottom 14, a thin wall 17, and an opening 18.

The side wall 12 has a substantially cylindrical external shape along the axial direction AD, and is disposed radially outside the coil portion 20. The thin wall 17 is connected to an end of the side wall 12 adjacent to the valve portion 200. A thickness of the thin wall 17 is smaller than that of the side wall 12. The thin wall 17 has the opening 18 of the yoke 10. The thin wall 17 is in contact with the outer peripheral surface 84 of the base portion 80, and is fixed to the base portion 80.

The bottom 14 is formed perpendicular to the axial direction AD and connected to the end of the side wall 12 opposite to the valve portion 200, and closes the end of the side wall 12. The bottom 14 is not limited to be perpendicular to the axial direction AD, and may be formed substantially perpendicularly or may be formed to intersect with the axial direction AD according to the shape of a magnetic flux transfer portion 65 described later. The bottom 14 faces a base end surface 34 of the plunger 30.

The coil portion 20 has a tubular shape and is arranged inside the side wall 12 of the yoke 10 in the radial direction. The coil portion 20 has a coil 21 and a bobbin 22. The coil 21 is formed of a conducting wire having an insulating coating. The bobbin 22 is made of resin, and the coil 21 is wound around the bobbin 22. The bobbin 22 is connected to a connector 26 arranged on the outer periphery of the yoke 10. A connection terminal 24 is arranged inside the connector 26, and the end of the coil 21 is connected to the connection terminal 24. The connector 26 electrically connects the solenoid portion 100 to the electronic control device via a connection line (not shown). The coil portion 20 generates a magnetic force when energized, and generates a loop magnetic flux passing through the side wall 12 of the yoke 10, the bottom 14 of the yoke 10, the stator core 40, the plunger 30, and the base portion 80 (hereinafter, referred to as "magnetic circuit C1"). In FIGS. 1 and 2, the coil portion 20 is not energized and a magnetic circuit is not formed. For convenience of explanation, a part of the magnetic circuit C1 formed when the coil portion 20 is energized is schematically indicated by a thick arrow in FIG. 2.

The plunger 30 has a substantially cylindrical external shape and is made of a magnetic metal. The plunger 30 slides in the axial direction AD on an inner peripheral surface of a core portion 61 of the stator core 40 described later. An end surface of the shaft 90 is in contact with the end surface of the plunger 30 adjacent to the valve portion 200 (hereinafter, also referred to as "distal end surface 32"). Thereby, the plunger 30 is urged toward the bottom 14 of the yoke 10 along the axial direction AD by the urging force of the spring 230 transmitted to the spool 220 shown in FIG. 1. As shown in FIG. 2, an end surface of the plunger 30 opposite to the distal end surface 32 (hereinafter, also referred to as a "base end surface 34") faces the bottom 14 of the yoke 10. The plunger 30 has a breathing hole (not shown) that penetrates in the axial direction AD. The breathing hole allows fluid such as hydraulic oil or air located around the base end surface 34 and the distal end surface 32 of the plunger 30 to flow.

The stator core 40 is made of a magnetic metal, and is disposed between the coil portion 20 and the plunger 30. The stator core 40 integrally includes a magnetic attraction core 50, a sliding core 60, and a magnetic flux passage suppresser 70.

The magnetic attraction core 50 is disposed so as to surround the shaft 90 in a circumferential direction. The magnetic attraction core 50 is a part of the stator core 40 adjacent to the valve portion 200, and magnetically attracts the plunger 30 by the magnetic force generated by the coil portion 20. A stopper 55 is disposed on a surface of the magnetic attraction core 50 facing the distal end surface 32 of the plunger 30. The stopper 55 is made of a non-magnetic material, and suppresses a direct contact between the plunger 30 and the magnetic attraction core 50. Further, the stopper 55 facilitates the plunger 30 to be separated from the magnetic attraction core 50 against the magnetic attraction. In the present embodiment, an outer peripheral surface of the magnetic attraction core 50 (hereinafter, referred to as "second outer peripheral surface 52") at the end portion adjacent to the valve portion 200 in the axial direction AD is fitted with the base portion 80.

The sliding core 60 is a part of the stator core 40 adjacent to the bottom 14, and is disposed radially outside the plunger 30. The sliding core 60 has a core portion 61 and a magnetic flux transfer portion 65.

The core portion 61 has a substantially cylindrical external shape, and is arranged between the coil portion 20 and the plunger 30 in the radial direction. The core portion 61 guides the movement of the plunger 30 in the axial direction AD. As a result, the plunger 30 slides directly in contact with an inner peripheral surface of the core portion 61. A sliding gap (not shown) is defined between the core portion 61 and the plunger 30 for ensuring the slidability of the plunger 30. An end portion of the sliding core 60 opposite to the magnetic attraction core 50 (hereinafter, also referred to as a "core end 62") is in contact with the bottom 14.

The magnetic flux transfer portion 65 is formed to extend radially outward from the core end 62 over the entire circumference of the core end 62. Therefore, the magnetic flux transfer portion 65 is arranged between the bobbin 22 and the bottom 14 of the yoke 10 in the axial direction AD. The magnetic flux transfer portion 65 transfers magnetic flux between the yoke 10 and the plunger 30 via the core portion 61. The magnetic flux transfer portion 65 of the present embodiment transfers magnetic flux between the bottom 14 of the yoke 10 and the plunger 30. The magnetic flux transfer portion 65 may transfer magnetic flux between the side wall 12 of the yoke 10 and the plunger 30. The magnetic flux transfer portion 65 of the present embodiment is formed integrally with the core portion 61. The magnetic flux transfer portion 65 and the core portion 61 may be integrated after being formed as separate bodies from each other. For example, the core portion 61 may be press-fitted into a through hole of the magnetic flux transfer portion 65 formed in a ring shape, or may be fixed by welding or the like after the core portion 61 is inserted into the through hole.

The magnetic flux passage suppresser 70 is formed between the magnetic attraction core 50 and the core portion 61 in the axial direction AD. The magnetic flux passage suppresser 70 suppresses the flow of magnetic flux directly between the core portion 61 and the magnetic attraction core 50. The magnetic flux passage suppresser 70 of the present embodiment is configured such that a thickness of the stator core 40 in the radial direction is formed to be thin, so that the magnetic resistance of the magnetic flux passage suppresser 70 is higher than that of the magnetic attraction core 50 and the core portion 61.

The base portion 80 is a substantially tubular magnetic member having a first inner diameter portion 81 having a first inner diameter in the radial direction, a second inner diameter portion 82 having an inner diameter smaller than that of the first inner diameter portion 81, and a connection surface 83 connecting the first inner diameter portion 81 and the second inner diameter portion 82. The connection surface 83 is extended substantially parallel to the radial direction. The first inner diameter portion 81 is fastened to the first outer peripheral surface 211 of the sleeve 210. The second inner diameter portion 82 is arranged outside of the second outer peripheral surface 52 of the magnetic attraction core 50 in the radial direction. The base portion 80 comes into contact with the yoke 10 inside the yoke 10. As shown in FIGS. 1 and 2, the connection surface 83 and the sleeve end surface 213 are separated from each other in the axial direction AD.

In the present embodiment, the end of the base portion 80 adjacent to the bottom 14 of the yoke 10 in the axial direction AD includes an end surface 85 and an end surface 86. The end surface 85 and the end surface 86 face to the bottom 14 and are extended substantially parallel in the radial direction. The end surface 85 is connected to the outer peripheral surface 84 on the outer side in the radial direction, and is located on the outer side in the radial direction with respect to the end surface 86. In this embodiment, the end surface 85 is referred to as a "first end surface". The end surface 86 is connected to the second inner diameter portion 82 and is located radially inside the end surface 85. The end surface 86 is located between the end surface 85 and the bottom 14 in the axial direction AD. The area of the end surface 85 is larger than the area of the end surface 86. The coil portion 20 is arranged between the bottom 14 and the end surface 85, 86 in the axial direction AD. In the present embodiment, the first inner diameter portion 81 of the base portion 80 is press-fitted and fastened with the first outer peripheral surface 211. Further, the second inner diameter portion 82 of the base portion 80 is fitted with the second outer peripheral surface 52. Further, the outer peripheral surface 84 of the base portion 80 is in contact with the thin wall 17 of the yoke 10, and is in contact with the side wall 12 of the yoke 10 in the axial direction AD on the radially outer side, adjacent to the solenoid portion 100 in the axial direction AD. The base portion 80 transfers a magnetic flux between the magnetic attraction core 50 of the stator core 40 and the side wall 12 of the yoke 10.

The elastic member 320 is housed in the elastic member housing 218 formed in the sleeve 210 of the valve portion 200 and urges the stator core 40 toward the bottom 14. The elastic member 320 is arranged in contact with the end surface of the magnetic attraction core 50 in the axial direction AD, opposite to the plunger 30. In the present embodiment, the elastic member 320 is configured by a compression coil spring having a substantially cylindrical external shape. The spool 220 is inserted radially inside the elastic member 320. Since the stator core 40 is urged in the axial direction AD toward the bottom 14 of the yoke 10 by the elastic member 320, the first magnetic flux transfer portion 65 is pressed against the bottom 14. Therefore, the loss of the magnetic flux transmitted from the bottom 14 of the yoke 10 to the magnetic flux transfer portion 65 is suppressed.

In the present embodiment, the main material of the base portion 80 and the main material of the sleeve 210 are different from each other. Therefore, the degree of freedom in manufacturing the solenoid valve 300 can be increased. The main material is a material having a content of 50% by weight or more. Further, in the present embodiment, the main material of the base portion 80 is a magnetic iron (Fe) based material such as pure iron, low carbon steel, and magnetic stainless steel. The low carbon steel is a steel having a carbon content of 0.025% by weight or less. Further, in the present embodiment, the main material of the sleeve 210 is aluminum (Al). Therefore, it is possible to secure the strength of the base portion 80 while reducing the weight of the sleeve 210. Further, in the present embodiment, the surface of the sleeve 210 is anodized. Therefore, a surface strength of the sleeve 210 can be increased, and the wear resistance can be improved. In other embodiments, the main material of the base portion 80 may be made of any magnetic material such as nickel or cobalt. Further, the main material of the sleeve 210 may be a material other than aluminum (Al).

In the present embodiment, the yoke 10, the plunger 30, and the stator core 40 are each made of iron but not limited thereto, and may be composed of a magnetic material such as nickel or cobalt. In the present embodiment, plating is applied on the outer peripheral surface of the plunger 30 to increase the hardness of the plunger 30 and to restrict deterioration in slidability. Further, in the present embodiment, the yoke 10 is formed by press molding and the stator core 40 is formed by forging, but each may be formed by other molding method. For example, the side wall 12 and the bottom 14 are formed separately from each other, and fixed integrally by caulking, press-fitting, or the like as the yoke 10.

When the coil 21 is energized from the states shown in FIGS. 1 and 2, the magnetic circuit C1 is formed inside the solenoid portion 100. The plunger 30 is drawn toward the magnetic attraction core 50 by the formation of the magnetic circuit C1 and slides on the inner peripheral surface of the core portion 61 in the axial direction AD. As the current flowing through the coil portion 20 increases, the density of magnetic flux of the magnetic circuit C1 increases, and the stroke amount of the plunger 30 increases.

When the plunger 30 moves toward the magnetic attraction core 50, the shaft 90 abutting on the distal end surface 32 of the plunger 30 presses the spool 220 shown in FIG. 1 toward the spring 230. As a result, the opening area of the oil port 214 is adjusted, and a hydraulic pressure proportional to the value of the current flowing through the coil 21 is output.

Figure 3:
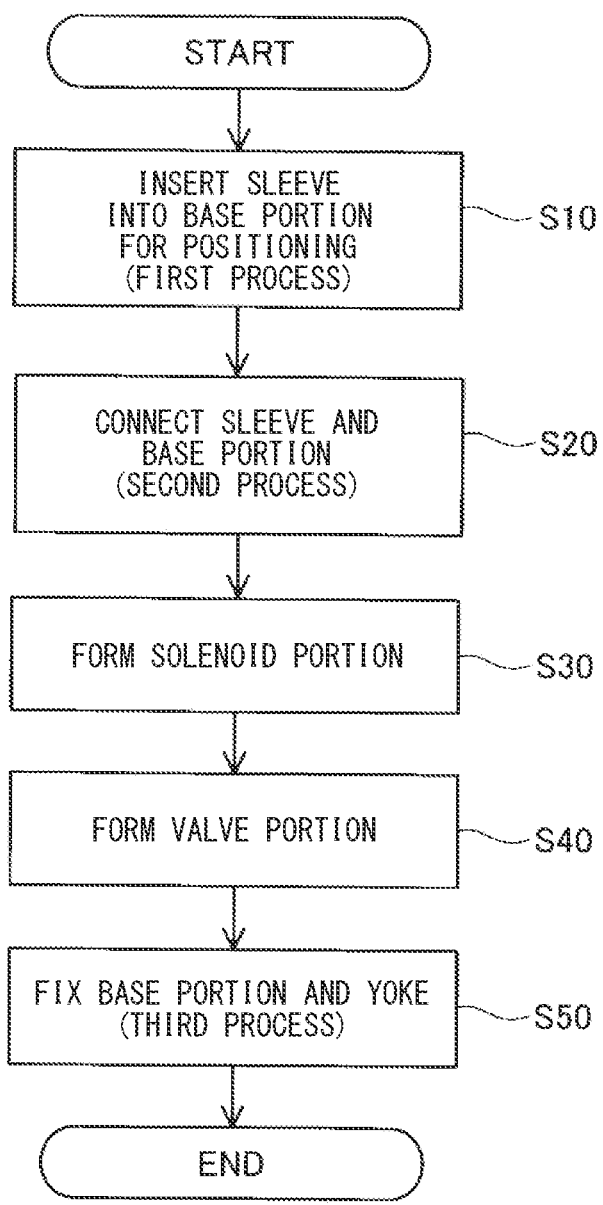
FIG. 3 is a diagram showing a method for manufacturing the solenoid valve.

As shown in FIG. 3, in the manufacture of the solenoid valve 300 of the present embodiment, in step S10, the sleeve 210 is inserted into the first inner diameter portion 81 of the base portion 80, and the position of the sleeve 210 is determined in the axial direction AD. Step S10 is also referred to as a "first step". In step S10, the position of the sleeve 210 in the axial direction AD is determined so that the connection surface 83 of the base portion 80 and the sleeve end surface 213 are separated from each other in the axial direction AD.

Figure 4:
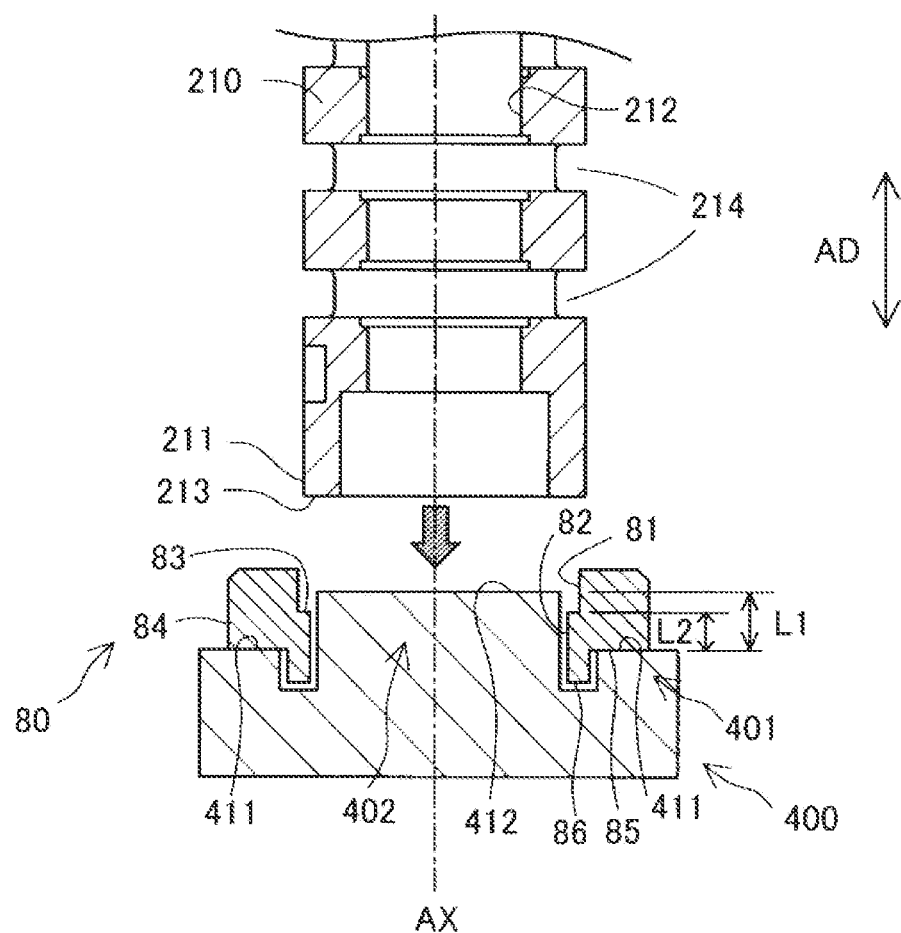
FIG. 4 is a diagram showing a base portion arranged on a jig in the first embodiment.

Specifically, in step S10, as shown in FIG. 4, the base portion 80 is arranged on the jig 400. In the present embodiment, the jig 400 has a first convex portion 401 located radially outward and a second convex portion 402 located radially inward of the first convex portion 401. The second convex portion 402 protrudes toward the sleeve 210 in the axial direction AD than the first convex portion 401 protrudes. The first contact surface 411, which is the tip end surface of the first convex portion 401, is configured to abut on the end surface 85 of the base portion 80 when the base portion 80 is arranged on the jig 400. When the end surface 85 of the base portion 80 and the first contact surface 411 come into contact with each other, the second convex portion 402 is located within the range from the end surface 86 of the base portion 80 up to the first inner diameter portion 81. Further, the second contact surface 412, which is the tip end surface of the convex portion 402, is located inside the first inner diameter portion 81 in the radial direction. Further, the jig 400 predefines the distance L1 between the first contact surface 411 and the second contact surface 412 in the axial direction AD. Due to the distance L1, when the base portion 80 and the sleeve 210 are fastened to each other, the connection surface 83 of the base portion 80 and the sleeve end surface 213 are separated from each other in the axial direction AD. In the present embodiment, the distance L1 is larger than the distance L2 between the end surface 85 of the base portion 80 and the connection surface 83 in the axial direction AD. In the present embodiment, the jig 400 is configured such that the contact area between the second contact surface 412 and the sleeve end surface 213 is larger than the area of the connection surface 83 of the base portion 80.

Figure 5:
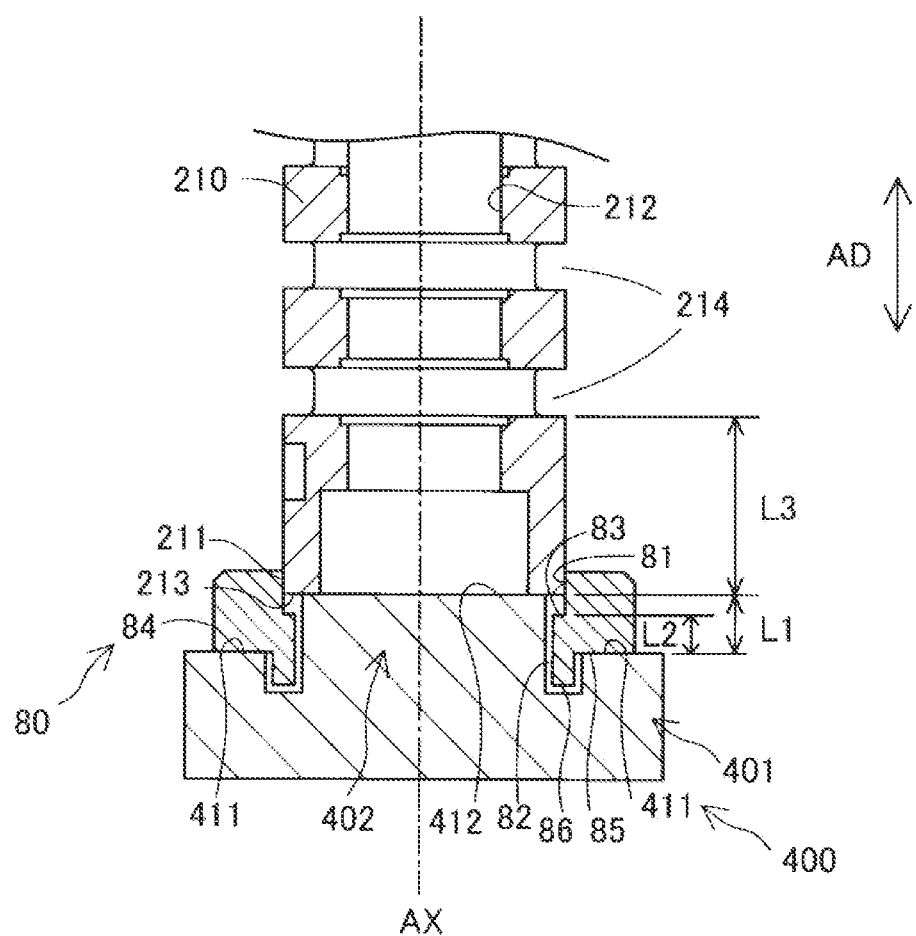
FIG. 5 is a diagram showing a sleeve positioned in the first embodiment.

When the base portion 80 is arranged on the jig 400 so that the end surface 85 of the base portion 80 comes into contact with the first contact surface 411, the sleeve 210 is inserted into the first inner diameter portion 81 of the base portion 80. As shown in FIG. 5, the sleeve 210 is inserted until the sleeve end surface 213 is in contact with the second contact surface 412. That is, the jig 400 exerts the function of positioning the sleeve end surface 213 in the axial direction AD when the sleeve 210 is inserted into the first inner diameter portion 81. In the present embodiment, the end surface 85 is also referred to as a "first end surface", and the sleeve end surface 213 is also referred to as a "second end surface". In the present embodiment, the sleeve 210 and the base portion 80 are fastened by press-fitting the first outer peripheral surface 211 of the sleeve 210 into the first inner diameter portion 81 of the base portion 80 (see FIG. 3, step S20). In the present embodiment, the first step (step S10) of determining the position of the sleeve 210 and the step (step S20) of fastening the sleeve 210 and the base portion 80 are performed at the same time. Step S20 is also referred to as a "second step".

In step S30, the solenoid portion 100 is formed with respect to an intermediate body formed in step S20 in which the sleeve 210 and the base portion 80 are fastened. For example, the yoke 10 having the thin wall 17 substantially parallel to the side wall 12 is prepared, and the plunger 30, the stator core 40, the coil portion 20, and the shaft 90 are arranged in the yoke 10. The base portion 80 fastened to the sleeve 210 is arranged radially outside the second outer peripheral surface 52 of the magnetic attraction core 50. In the present embodiment, the base portion 80 is fitted to the second outer peripheral surface 52. The base portion 80 may be slidable with respect to the second outer peripheral surface 52.

In step S40, the spool 220, the spring 230, and the spring load adjuster 240 are arranged in the sleeve 210 fastened to the base portion 80 to form the valve portion 200.

In step S50, the base portion 80 and the yoke 10 are fastened and fixed. Step S50 is also referred to as a "third step". In the present embodiment, the base portion 80 and the thin wall 17 of the yoke 10 are fastened to each other by plastic deformation. In addition, instead of the plastic deformation, an arbitrary method such as welding may be used. The above manufacturing method is an example and may be changed as appropriate. As described above, the solenoid valve 300 is manufactured.

The solenoid valve 300 of the first embodiment has the base portion 80. The base portion 80 is fastened to the first outer peripheral surface 211 of the end portion of the sleeve 210 adjacent to the solenoid portion 100 in the axial direction AD, and is arranged radially outside the second outer peripheral surface 52 of the end portion of the magnetic attraction core 50 adjacent to the valve portion 200 in the axial direction AD. The base portion 80 is fixed to the thin wall 17 of the yoke 10. Therefore, the solenoid portion 100 and the valve portion 200 can be fastened to each other by the base portion 80. Therefore, the structure of the sleeve 210 can be simplified and the manufacturing cost of the solenoid valve 300 can be suppressed, compared with a configuration in which a flange is formed on the sleeve 210 of the valve portion 200 such that the solenoid portion and the valve portion are fastened by fixing the flange and the yoke 10. Further, since the base portion 80 made of the magnetic material is arranged outside the second outer peripheral surface 52 of the magnetic attraction core 50 in the radial direction and comes into contact with the yoke 10 inside the yoke 10, the base portion 80 can transfer the magnetic flux between the magnetic attraction core 50 and the yoke 10. Therefore, it is possible to form a magnetic circuit while suppressing the manufacturing cost.

Further, since the first outer peripheral surface 211 of the sleeve 210 is press-fitted into the base portion 80, the fastening strength between the valve portion 200 and the solenoid portion 100 can be easily controlled by adjusting the dimensions of the first inner diameter portion 81 of the base portion 80.

According to the solenoid portion 100, the sliding core 60 has the tubular core portion 61 arranged radially outside the plunger 30 and the magnetic flux transfer portion 65 formed to extend radially outward from the core end 62 of the core portion 61 to transfer the magnetic flux. Therefore, there is almost no gap between the core portion 61 and the magnetic flux transfer portion 65 in the radial direction. It is possible to restrict the core portion 61 and the magnetic flux transfer portion 65 from being eccentric. Therefore, it is possible to suppress the occurrence of radial bias in the distribution of the magnetic flux transmitted from the magnetic flux transfer portion 65 to the plunger 30 via the core portion 61 due to such the eccentricity. Therefore, it is possible to suppress an increase in side force due to the bias in the distribution of magnetic flux.

Figure 6:
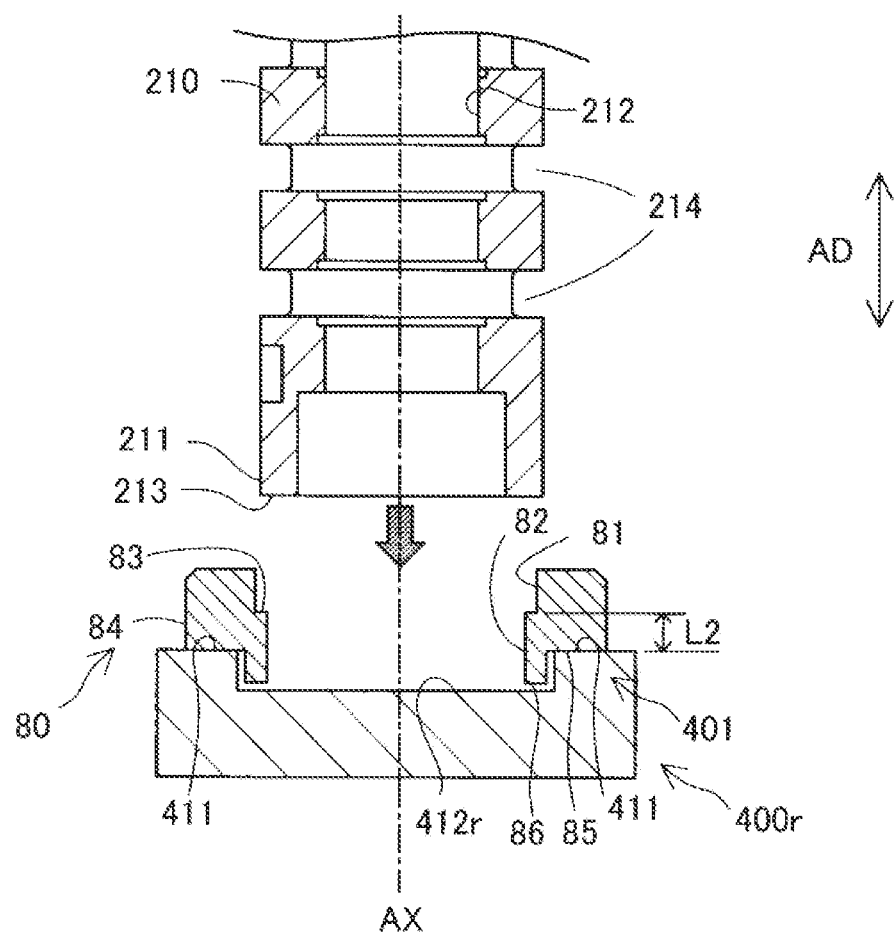
FIG. 6 is a diagram showing a base portion arranged on a jig in a reference example.
Figure 7:
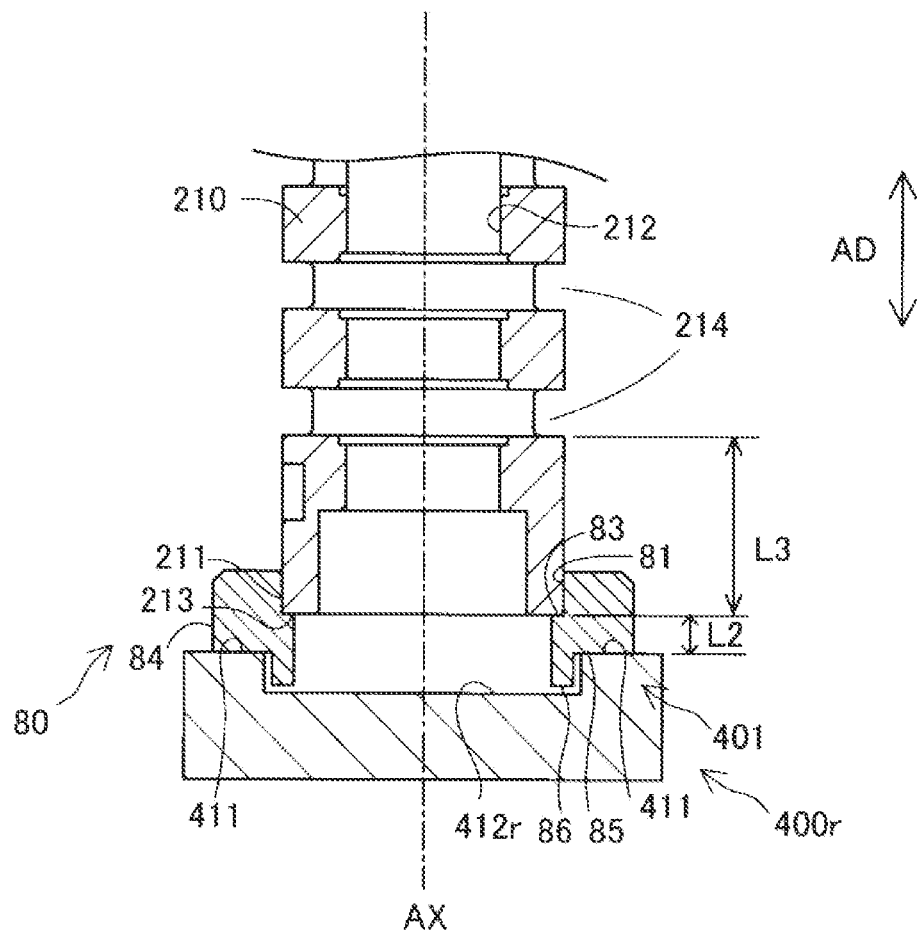
FIG. 7 is a diagram showing a sleeve positioned in the reference example.

Hereinafter, the advantage achieved by the configuration in which the sleeve end surface 213 and the connection surface 83 of the base portion 80 are separated from each other in the axial direction AD will be described with reference to a reference example. As shown in FIG. 6, a jig 400r in the reference example does not have the second convex portion 402, but has a concave portion 412r recessed from the first convex portion 401 in the insertion direction of the sleeve 210, differently from the jig 400 in the first embodiment. In the reference example, when the base portion 80 is arranged on the jig 400r, as shown in FIG. 7, the sleeve 210 is inserted into the first inner diameter portion 81 of the base portion 80 until the sleeve end surface 213 contacts the connection surface 83 of the base portion 80. In the reference example, the connection surface 83 exerts the function of positioning the sleeve end surface 213 in the axial direction AD. Therefore, in the reference example, in the first step (see FIG. 3, step S10), a load is applied to the connection surface 83 of the base portion 80 from the sleeve end surface 213. In contrast, in the present embodiment, in the first step, the position of the sleeve 210 in the axial direction AD is determined so that the connection surface 83 of the base portion 80 and the sleeve end surface 213 are separated from each other in the axial direction AD (FIG. 5). Therefore, since no load is applied from the sleeve end surface 213 to the connection surface 83 of the base portion 80, it is possible to restrict the base portion 80 from being deformed.

Further, in the present embodiment, the jig 400 is configured so that the area of the contact between the second contact surface 412 and the sleeve end surface 213 is larger than the area of the connection surface 83 of the base portion 80. Therefore, the load applied to the sleeve end surface 213 can be reduced, and the deformation of the sleeve end surface 213 can be suppressed, as compared with the reference example in which the sleeve end surface 213 is brought into contact with the connection surface 83.

The distance L1 shown in FIGS. 4 and 5 is defined between the first contact surface 411 and the second contact surface 412 of the jig 400 in the axial direction AD. The distance L1 is predetermined so that the connection surface 83 of the base portion 80 and the sleeve end surface 213 are separated from each other in the axial direction AD when the base portion 80 and the sleeve 210 are fastened. The distance L1 varies within the manufacturing tolerance of the jig 400. The distance L2 shown in FIGS. 4 to 7 is defined between the end surface 85 of the base portion 80 and the connection surface 83 in the axial direction AD. The distance L3 shown in FIGS. 5 and 7 is defined from the sleeve end surface 213 to a predetermined position of the sleeve 210 in the axial direction AD. In the present embodiment and the reference example, the distance L3 is shown as a distance up to one of the oil ports 214 in the axial direction AD. The distance L2 varies within the manufacturing tolerance of the base portion 80, and the distance L3 varies within the manufacturing tolerance of the sleeve 210. In the reference example, since the connection surface 83 exerts the function of positioning the sleeve end surface 213 in the axial direction AD, the length (hereinafter, dimension) of the solenoid valve 300 in the axial direction AD is affected by the total value of the distance L2 and the distance L3. That is, the dimensions of the solenoid valve manufactured by the manufacturing method of the reference example vary at least within the range including the manufacturing tolerance of the base portion 80 and the manufacturing tolerance of the sleeve 210.

In the present embodiment, since the jig 400 exerts the function of positioning the sleeve end surface 213 in the axial direction AD, the dimensions of the solenoid valve 300 differ depending on the total value of the distance L1 and the distance L3, and varies within the range including the manufacturing tolerance of the jig 400 and the manufacturing tolerance of the sleeve 210. When manufacturing plural solenoid valves 300, the same jig 400 can be used. Therefore, in the present embodiment, the dimensions of the solenoid valve 300 vary within the manufacturing tolerance of the sleeve 210. Therefore, in the present embodiment, it is possible to suppress dimensional variation among the solenoid valves 300 as compared with the reference example. As a result, it is possible to suppress the variation in the position of the oil port 214 in the axial direction AD, so that it is possible to suppress the variation in the discharge capacity among the solenoid valves 300.

Second Embodiment

Figure 8:
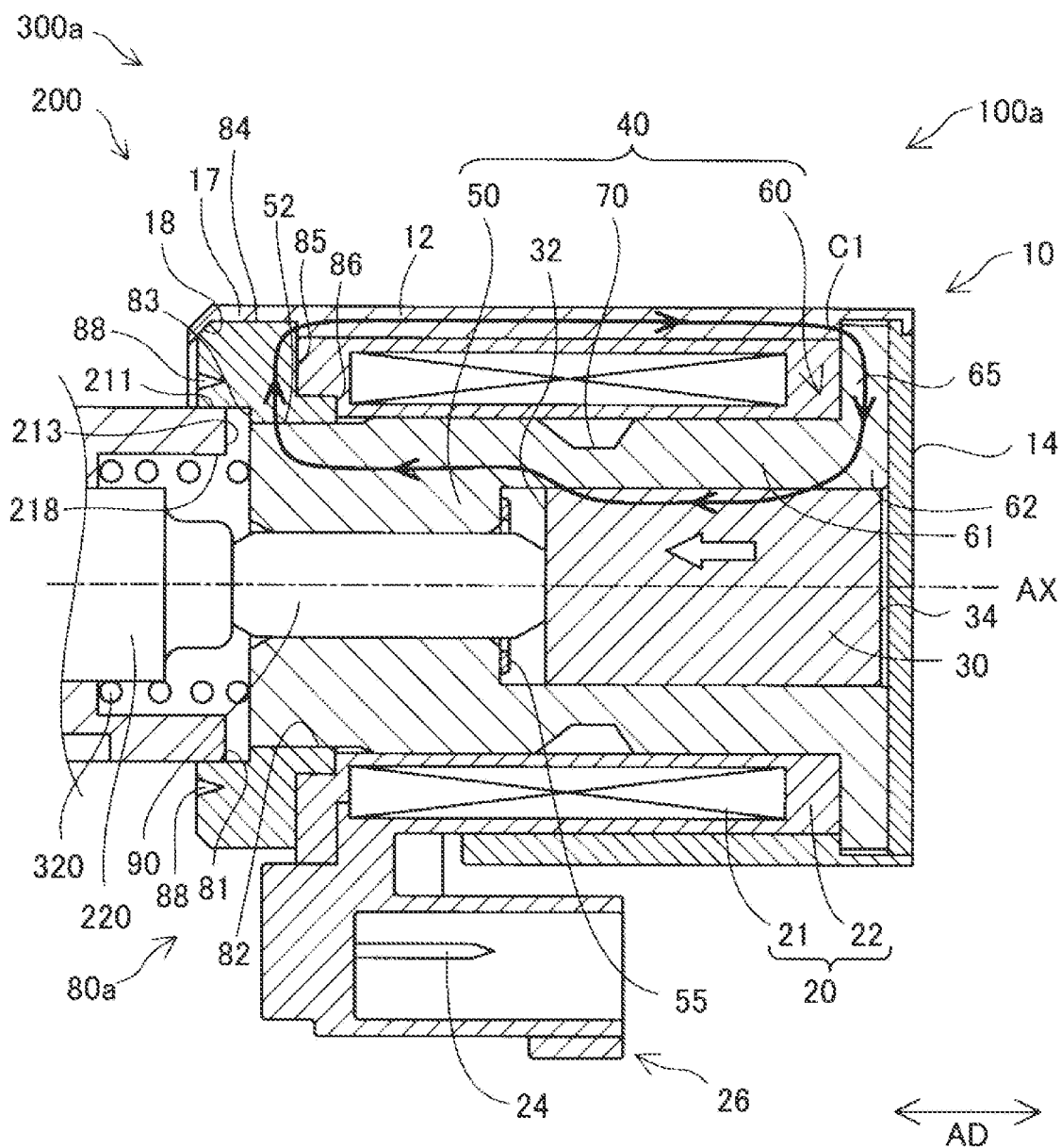
FIG. 8 is a partial cross-sectional view schematically showing a solenoid valve according to a second embodiment.

In the solenoid valve 300 of the first embodiment, the first outer peripheral surface 211 of the sleeve 210 is press-fitted and fastened to the base portion 80. In a solenoid valve 300a of a second embodiment, as shown in FIG. 8, the sleeve 210 and the base portion 80a of the solenoid portion 100a are fixed by caulking or plastic deformation such that the first outer peripheral surface 211 and the base portion 80a are fastened, differently from the first embodiment. FIG. 8 corresponds to FIG. 2 of the first embodiment. In the second step (FIG. 3, step S20) of fastening the sleeve 210 and the base portion 80a of the second embodiment, the base portion 80a has a caulking portion 88 located adjacent to the valve portion 200, and is caulked and fixed by a caulking receiver (not shown) of the first outer peripheral surface 211, such that the first outer peripheral surface 211 of the sleeve 210 and the base portion 80a are fixed with each other. As a method for fastening by caulking, for example, a staking method or a package method may be used. Since the other configurations are the same as those of the solenoid valve 300 of the first embodiment, the same configurations are designated by the same reference numerals, and detailed description thereof will be omitted. The same applies to the following embodiments.

According to the solenoid valve 300a of the second embodiment, the load due to press fitting is suppressed from being applied to the first inner diameter portion 81 of the base portion 80a, so that the deformation of the base portion 80a can be suppressed. Further, the fastening strength between the valve portion 200 and the solenoid portion 100a can be easily adjusted by adjusting the shape for fixing the base portion 80a and the first outer peripheral surface 211 of the sleeve 210 and the load for the caulking.

Further, according to the solenoid valve 300a of the second embodiment, the same effect as that of the first embodiment is obtained except for the effect obtained by press-fitting the first outer peripheral surface 211 of the sleeve 210 into the base portion 80.

Third Embodiment

Figure 9:
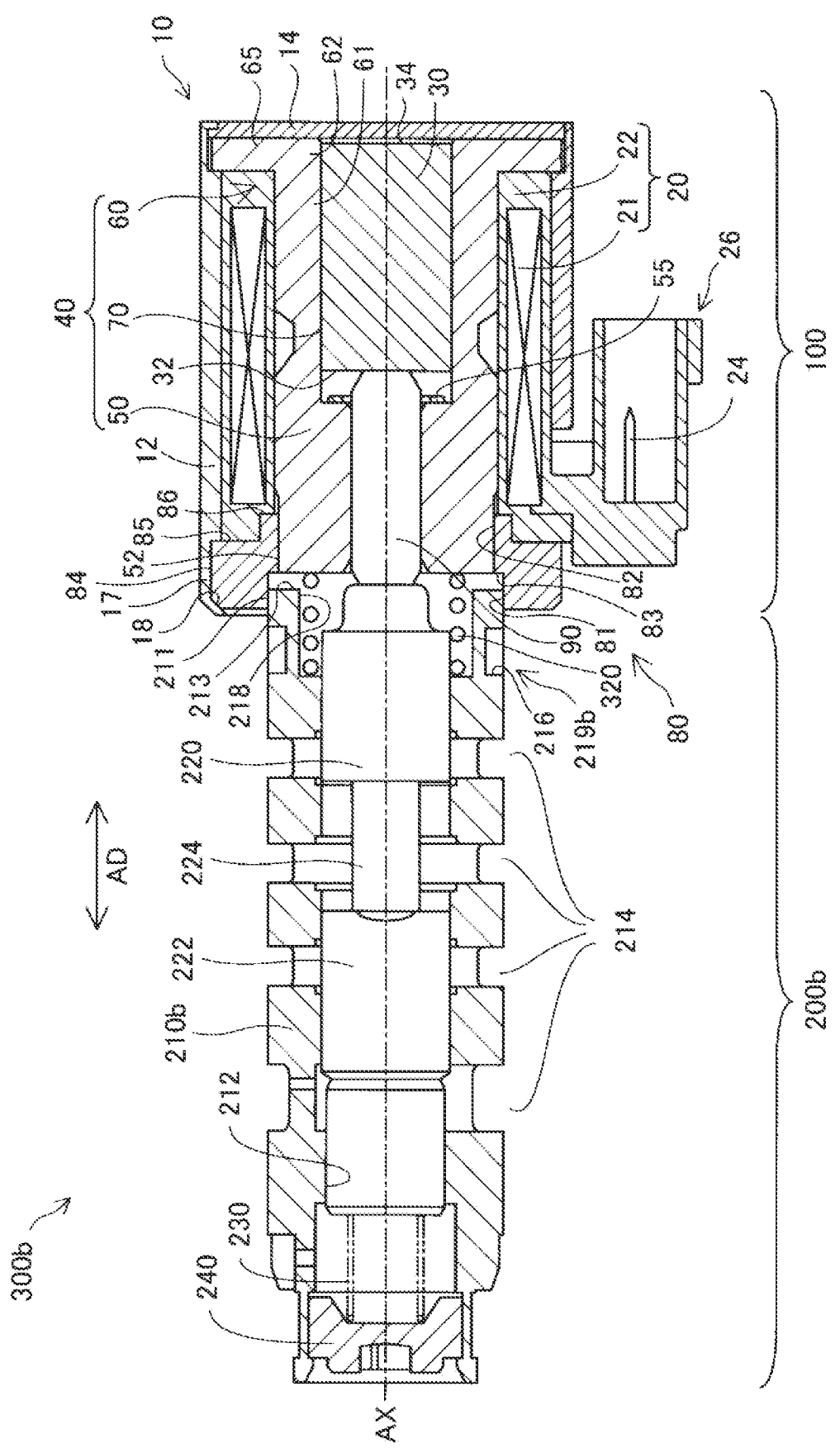
FIG. 9 is a cross-sectional view schematically showing a solenoid valve according to a third embodiment.

A solenoid valve 300b of the present embodiment shown in FIG. 9 is different from the first embodiment in that two recessed portions 219b recessed inward in the radial direction are provided on the outer peripheral surface of the sleeve 210b of the valve portion 200b. The recessed portion 219b has a surface 216 that faces the solenoid portion 100 in the axial direction AD and is substantially parallel to the radial direction. Since the other configurations of the solenoid valve 300b are the same as those of the solenoid valve 300 of the first embodiment, the description thereof will be omitted.

Figure 10:
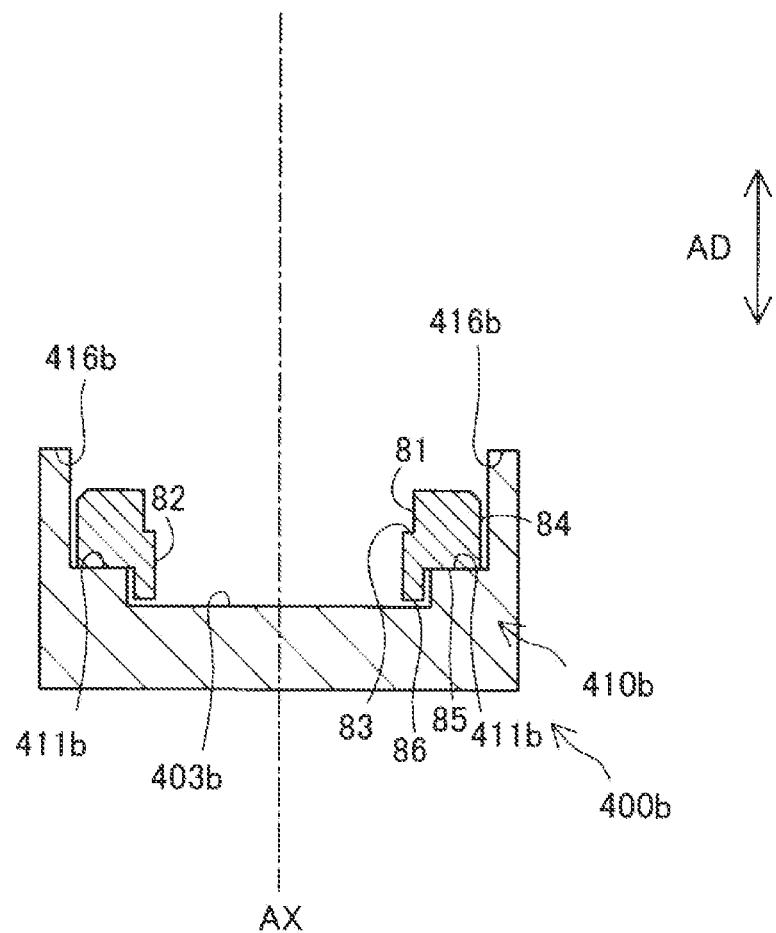
FIG. 10 is a diagram showing a base portion arranged on a jig in the third embodiment.
Figure 11:
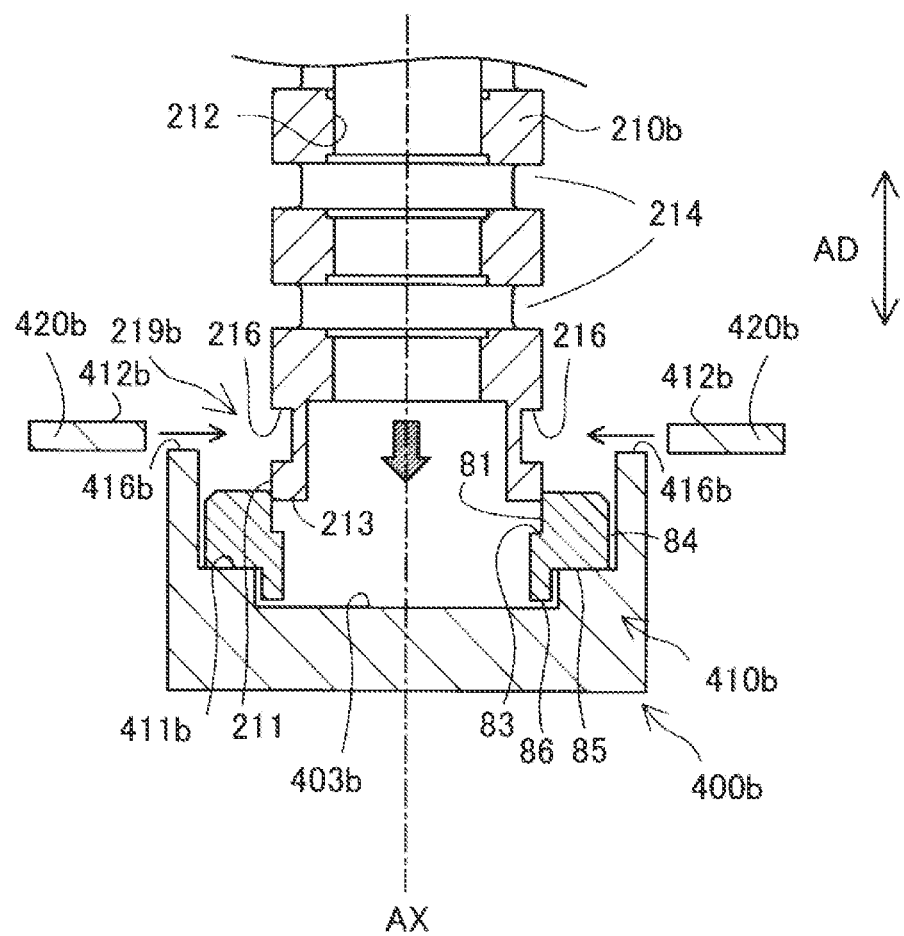
FIG. 11 is a diagram showing a sleeve inserted into the base portion in the third embodiment.
Figure 12:
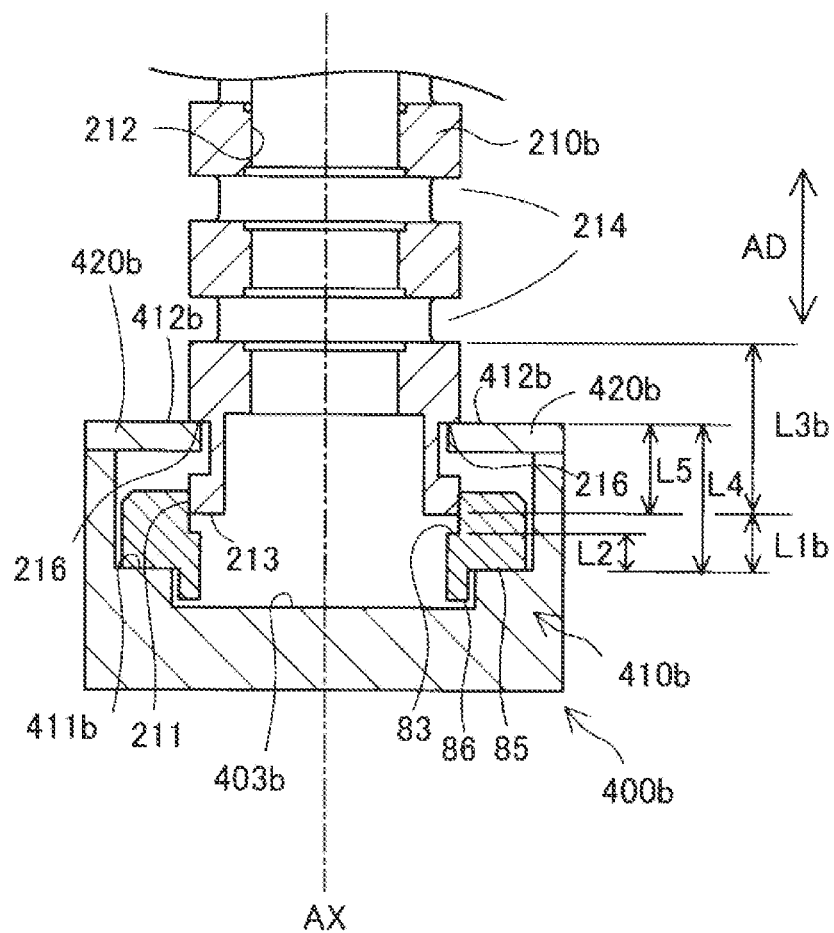
FIG. 12 is a diagram showing the sleeve positioned in the third embodiment.

In the manufacture of the solenoid valve 300b of the present embodiment, in the first step (see FIG. 3, step S10), the position of the sleeve 210 in the axial direction AD is determined such that the connection surface 83 of the base portion 80 and the sleeve end surface 213 are separated from each other in the axial direction AD, as in the first embodiment. In this embodiment, a jig 400b shown in FIGS. 10 to 12 is used. The jig 400b includes a support jig 410b that supports the base portion 80 and a slide jig 420b configured to slide in the radial direction so as to be installed on the end surface 416b of the support jig 410b adjacent to the valve portion 200 in the axial direction AD. The support jig 410b includes a radial inner surface 403b and a first contact surface 411b located between the sleeve 210b and the radial inner surface 403b in the axial direction AD. The first contact surface 411b is located radially outside of the radial inner surface 403b. The end surface 416b of the support jig 410b is located between the sleeve 210b and the first contact surface 411b in the axial direction AD, and is located radially outside the first contact surface 411b.

In the present embodiment, as shown in FIG. 10, in the first step, the base portion 80 is arranged on the support jig 410b so that the end surface 85 of the base portion 80 and the first contact surface 411b are in contact with each other. When the base portion 80 is arranged on the support jig 410b, as shown in FIG. 11, the sleeve 210b is inserted into the first inner diameter portion 81 of the base portion 80, and the slide jig 420b is arranged on the end surface 416b of the support jig 410b. As shown in FIG. 12, the sleeve 210b is inserted until the surface 216 of the recessed portion 219b comes into contact with the upper surface 412b of the slide jig 420b. In the present embodiment, the end surface 85 of the base portion 80 is also referred to as a "first end surface", and the surface 216 of the sleeve 210b is also referred to as a "second end surface". Further, the upper surface 412b of the slide jig 420b is also referred to as a "second contact surface". The jig 400b defines a predetermined distance L4 between the first contact surface 411b and the upper surface 412b in the axial direction AD, so that the connection surface 83 of the base portion 80 and the sleeve end surface 213 are separated in the axial direction AD when the base portion 80 and the sleeve 210*b* are fastened to each other. In the present embodiment, as in the first embodiment, the jig 400*b* exerts the function of positioning the sleeve end surface 213 in the axial direction AD.

The distance L1*b* shown in FIG. 12 is defined from the sleeve end surface 213 to the first contact surface 411*b*. The distance L5 is defined from the surface 216 of the sleeve 210*b* to the sleeve end surface 213. Since the distance L1*b* is obtained by subtracting the distance L5 from the distance L4, the distance L1*b* varies within the range in which the manufacturing tolerance of the jig 400*b* and the manufacturing tolerance of the sleeve 210*b* are combined. The distance L3*b* is defined from the sleeve end surface 213 to the predetermined position of the sleeve 210*b* in the axial direction AD, and is shown as the distance to one of the oil ports 214 in the axial direction AD in FIG. 12. The distance L3*b* varies within the manufacturing tolerances of the sleeve 210*b*. The dimensions of the solenoid valve 300*b* in this embodiment differ depending on the total value of the distance L1*b* and the distance L3*b*. That is, the dimensions of the solenoid valve 300*b* vary within the range in which the manufacturing tolerance of the jig 400*b* and the manufacturing tolerance of the sleeve 210*b* are combined. Similar to the first embodiment, when plural solenoid valves 300*b* are manufactured, the same jig 400*b* can be used. Therefore, in the present embodiment, the dimensions of the solenoid valve 300*b* vary within the manufacturing tolerance of the sleeve 210*b*. Therefore, in the present embodiment, the dimensional variation can be suppressed for the solenoid valve 300*b* as in the first embodiment. Therefore, since it is possible to suppress the variation in the position of the oil port 214 in the axial direction AD, it is possible to suppress the variation in the discharge capacity for the solenoid valve 300*b*.

Other Embodiment (1) In the manufacturing method of each of the embodiments, the order of the steps may be changed while the positioning is performed so that the connection surface 83 of the base portion 80, 80*a* and the sleeve end surface 213 are separated from each other in the axial direction AD, and the base portion 80, 80*a* and the sleeve 210, 210*b* are coupled with each other. Further, instead of abutting the jig 400, 400*b* on the end surface 85 of the base portion 80, 80*a*, it is possible to abut a positioning jig 400*c* on another surface of members of the solenoid portion 100, 100*a* facing the bottom 14 with respect to the valve portion 200 in the axial direction AD.

Figure 13:
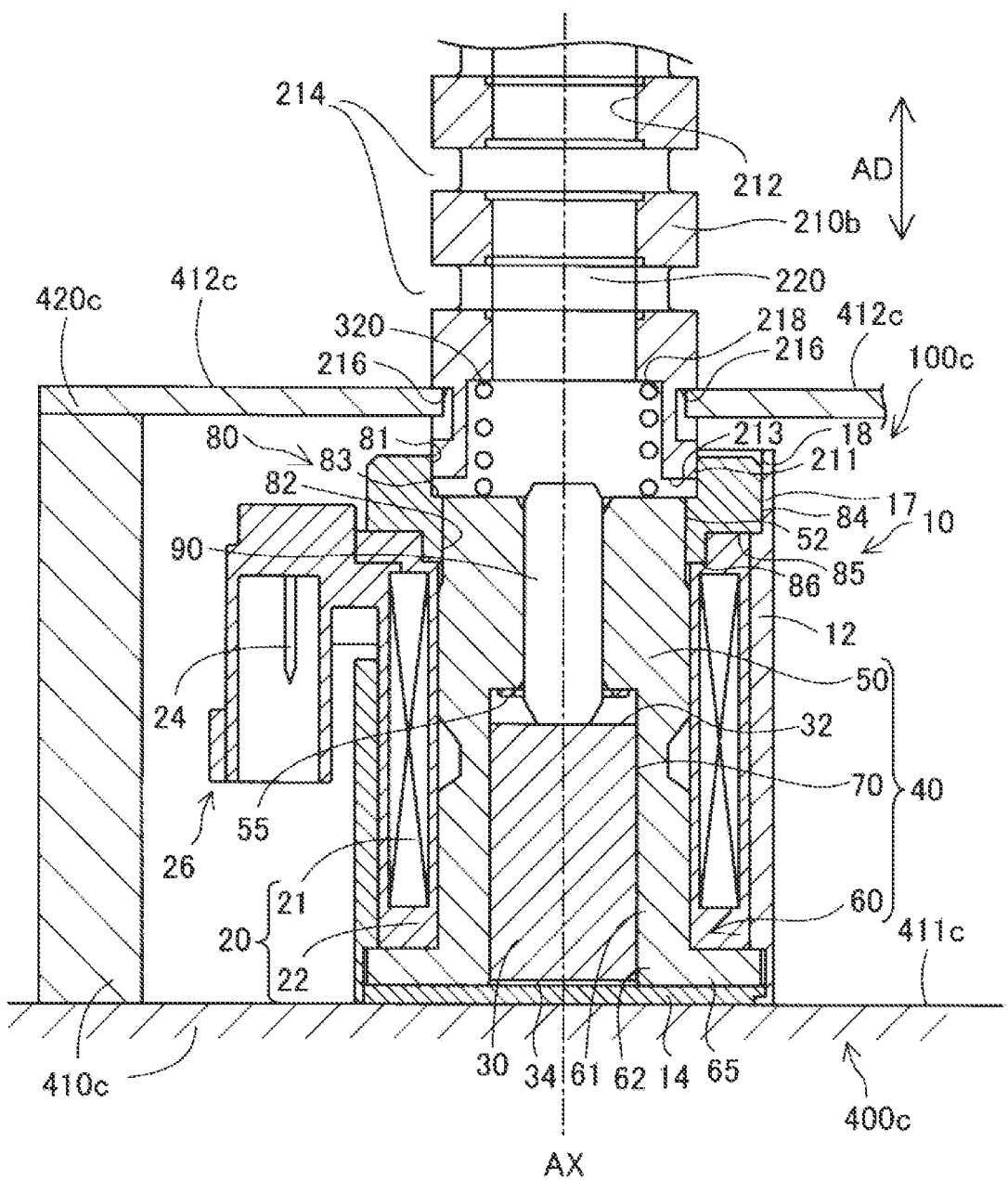
FIG. 13 is an image diagram showing a first step in the other embodiment.

In FIG. 13, an intermediate product 100*c*, which is a solenoid portion before fastening the yoke 10 to the base portion 80, is formed, and then the first contact surface 411*c* of the support jig 410*c* is brought into contact with the bottom 14 of the yoke 10. Then, as in the third embodiment, the upper surface 412*c* of the slide jig 420*c* is brought into contact with the surface 216 of the sleeve 210*b* while the sleeve 210*b* is inserted into the base portion 80. In this way, the sleeve 210*b* may be positioned. In this embodiment, the surface of the bottom 14 adjacent to the first contact surface 411*c* is referred to as a "first end surface", and the surface 216 of the sleeve 210*b* is referred to as a "second end surface". This embodiment also has the same effect as that of the above-described embodiment.

(2) In the first embodiment, the recessed portion 219 as a positioning hole when mounted on the valve body may be used for positioning the sleeve 210. Specifically, the upper surface 412*b*, 412*c* of the jig 400*b*, 400*c* used in the third embodiment or the other embodiment is made in contact with a surface of the recessed portion 219 facing the bottom 14 in the axial direction AD. The sleeve 210 may be positioned in the same manner as in the third embodiment or the other embodiment.

(3) In each of the embodiments, the main material of the base portion 80, 80*a* and the main material of the sleeve 210, 210*b* may be the same. Accordingly, the thermal expansion rate can be made substantially the same between the base portion 80 and the sleeve 210, 210*b*. Therefore, it is possible to suppress the generation of stress due to the difference in the coefficient of thermal expansion between the base portions 80, 80*a* and the sleeve 210. It is possible to keep stress generated by press-fitting or caulking while there is a difference in the coefficient of thermal contraction between the base portion 80, 80*a* and the sleeve 210. Thus, the strength of the solenoid valve 300, 300*a*, 300*b* can be increased.

(4) In each of the embodiments, the hardness of the main material of the base portion 80, 80*a* and the hardness of the main material of the sleeve 210 may be different from each other. In this case, one of the base portion 80, 80*a* and the sleeve 210 having low hardness may be scraped off when the base portion 80, 80*a* is press-fitted into the sleeve 210. However, the location where a foreign matter is generated by press-fitting can be specified in advance. Further, the main material of the foreign matter can be specified in advance. Therefore, the processing after the press-fitting can be appropriately performed.

(5) The configuration of the solenoid portion 100, 100*a*, 100*b* of each of the embodiments is an example and can be changed in various ways. For example, the core portion 61 of the sliding core 60 and the magnetic flux transfer portion 65 may be formed separately from each other. In such a configuration, the core portion 61 may be press-fitted into the inner hole of the magnetic flux transfer portion 65 formed in an annular shape. Further, for example, the elastic member 320 is not limited to the compression coil spring, and may be composed of any elastic member such as a disc spring or a leaf spring. The elastic member 320 may be arranged between the coil portion 20 and the magnetic flux transfer portion 65 in the axial direction AD instead of the elastic member housing 218 to urge the magnetic flux transfer portion 65. Such a configuration also achieves the same effects as those of the embodiment.

(6) The solenoid valve 300, 300*a*, 300*b* of each of the embodiments is applied to a linear solenoid valve for controlling the hydraulic pressure of hydraulic oil supplied to an automatic transmission for a vehicle, but is not limited thereto. For example, the solenoid valve is not limited to being mounted on the valve body provided on the outer surface of the transmission case, but may be mounted on any hydraulic device that requires control of hydraulic pressure.

The present disclosure should not be limited to the embodiments described above, and various other embodiments may be implemented without departing from the scope of the present disclosure. For example, the technical features in each embodiment may be used to solve some or all of the above-described problems, or to provide one of the above-described effects. In order to achieve a part or all, replacement or combination can be appropriately performed. Also, if the technical features are not described as essential in the present specification, they can be deleted as appropriate.

What is claimed is:

1. A solenoid valve comprising:
a valve portion including
a sleeve extending in an axial direction, and
a spool arranged in the sleeve to slide in the axial direction; and
a solenoid portion including
a coil that generates a magnetic force when being energized,
a magnetic yoke housing the coil, the magnetic yoke having a side wall extended in the axial direction and a bottom formed to extend in a direction intersecting the axial direction,
a plunger that slides in the axial direction, and
a stator core, wherein a shaft is disposed at an end of the spool adjacent to the solenoid portion in the axial direction so as to transmit a thrust of the solenoid portion to the valve portion,
the stator core includes
a magnetic attraction core arranged to face a distal end surface of the plunger in the axial direction and configured to attract magnetically the plunger by the magnetic force generated by the coil,
a sliding core having
a core portion arranged inside the coil in a radial direction orthogonal to the axial direction and housing the plunger, and
a magnetic flux transfer portion formed radially outward from a core end which is an end portion of the core portion in the axial direction and faces the bottom so as to transfer magnetic flux between the yoke and the core portion, and
a magnetic flux passage suppresser configured to suppress passage of magnetic flux between the sliding core and the magnetic attraction core,
the solenoid portion has a base portion made of a magnetic pipe arranged inside the yoke to be in contact with the yoke,
the base portion has
a first inner diameter portion having a first inner diameter in the radial direction,
a second inner diameter portion located between the first inner diameter portion and the bottom in the axial direction and having a second inner diameter smaller than the first inner diameter,
a connection surface connecting the first inner diameter portion and the second inner diameter portion in the radial direction,
the first inner diameter portion is fastened to a first outer peripheral surface of an end portion of the sleeve adjacent to the solenoid portion in the axial direction,
the second inner diameter portion is located radially outside a second outer peripheral surface of an end portion of the magnetic attraction core adjacent to the valve portion in the axial direction, and
the connection surface and a sleeve end surface of the sleeve adjacent to the solenoid portion in the axial direction are spaced from each other in the axial direction.

2. The solenoid valve according to claim 1, wherein the first outer peripheral surface of the sleeve is press-fitted into the first inner diameter portion of the base portion.

3. The solenoid valve according to claim 1, wherein the first outer peripheral surface of the sleeve and the first inner diameter portion of the base portion are fixed to each other by a caulking.

4. A manufacturing method of manufacturing the solenoid valve according to claim 1, the manufacturing method comprising:
positioning the sleeve relative to the base portion by inserting the sleeve into the base portion, so that the connection surface of the base portion and the sleeve end surface of the sleeve are spaced from each other in the axial direction in a first step,
fastening the sleeve and the base portion in a second step, and
fixing the base portion and the yoke in a contact state in a third step.

5. The manufacturing method according to claim 4, wherein the first outer peripheral surface is press-fitted into the first inner diameter portion to fasten the sleeve and the base portion in the second step.

6. The manufacturing method according to claim 4, wherein the first outer peripheral surface and the first inner diameter portion are fixed by caulking to fasten the sleeve and the base portion in the second step.

7. The manufacturing method according to claim 4, wherein
in the first step, positioning the connection surface and the sleeve end surface in the axial direction using a jig,
the jig has a first contact surface that abuts on a first end surface of the solenoid portion in the axial direction,
the jig has a second contact surface that abuts on a second end surface of the sleeve in the axial direction when the sleeve is inserted into the base portion in a state where the first end surface and the first contact surface are in contact with each other, and
a distance between the first contact surface and the second contact surface in the axial direction is predetermined in the jig.

8. The manufacturing method according to claim 7, wherein the first end surface of the solenoid portion is an end surface of the base portion facing the bottom in the axial direction.

9. The manufacturing method according to claim 7, wherein the second end surface of the sleeve is the sleeve end surface.

* * * * *